United States Patent [19]

Schramm

[11] 4,166,326
[45] Sep. 4, 1979

[54] EDUCATIONAL TEACHING AID

[76] Inventor: Chris Schramm, Box 1200, Drayton Valley, Alberta, Canada

[21] Appl. No.: 899,740

[22] Filed: Apr. 25, 1978

[30] Foreign Application Priority Data

May 12, 1977 [CA] Canada .................................. 278279

[51] Int. Cl.² .............................................. G09B 3/10
[52] U.S. Cl. ..................................... 35/9 A; 35/31 C
[58] Field of Search ................ 35/9 R, 9 A, 9 E, 9 F, 35/31 C, 76

[56] References Cited

U.S. PATENT DOCUMENTS

| | | | |
|---|---|---|---|
| 2,498,578 | 2/1950 | Reinnagel | 35/76 X |
| 2,690,621 | 10/1954 | Dean | 35/9 A |
| 2,911,741 | 11/1959 | Boyer | 35/9 A |
| 2,937,455 | 5/1960 | Perkins et al. | 35/76 X |
| 3,120,066 | 2/1964 | Reeves | 35/76 X |
| 3,303,580 | 2/1967 | Stinar | 35/9 E |
| 3,538,621 | 11/1970 | Mayeda | 35/9 E |
| 3,617,260 | 11/1971 | Detert | 75/170 |
| 3,696,528 | 10/1972 | Mertz | 35/9 R X |
| 3,735,500 | 5/1973 | Matsumoto | 35/9 A |
| 3,918,173 | 11/1975 | Logos | 35/9 R |

FOREIGN PATENT DOCUMENTS

| | | | |
|---|---|---|---|
| 696380 | 10/1964 | Canada | 35/9 F |
| 972952 | 8/1975 | Canada | 35/6 |
| 983261 | 2/1976 | Canada | 35/6 |

Primary Examiner—William H. Grieb
Attorney, Agent, or Firm—George H. Dunsmuir

[57] ABSTRACT

A teaching apparatus including a casing with two windows therein, and a plurality of buttons in front of one of the windows. The buttons are aligned with answers, for example answers to mathematical questions, visible in such one window, and one question is visible in the other window. If the button in front of the correct answer is pressed, the question disappears and the same or a different question appears in such other window. If one of the buttons in front of the incorrect answers is pressed, nothing happens, i.e., the question remains in view. The set of questions and answers can be changed, because the questions and answers are both on tapes containing a large number of questions and answers. The tape bearing the questions is mounted on spools in a transparent cylindrical cup, the tape extending around the inner periphery of the cup. The cup is integral with a cam shaft rotatably mounted in the casing, the shaft including cams engageable, one at a time, by levers connected to the buttons to cause the shaft and cup to rotate.

7 Claims, 5 Drawing Figures

EDUCATIONAL TEACHING AID

FIELD OF THE INVENTION

This invention relates to a teaching apparatus.

More specifically, the present invention relates to a teaching apparatus of the type including two separate series of questions and answers. Questions are presented to the student one at a time, while a plurality of answers are presented for viewing at the same time. The question remains in view until the student chooses the right answer and actuates the question carrying portion of the apparatus to introduce another question into the question viewing portion of the apparatus. Thus, the invention provides a teaching apparatus which is in the nature of a game.

BACKGROUND OF THE INVENTION

There are presently available many teaching aids such as those disclosed by Canadian Pat. Nos. 696,380, which issued to Graflex, Inc. on Oct. 20, 1964; 972,952, which issued to A. R. Schmoyer on Aug. 19, 1975 and 983,261, which issued to Kee, Incorporated on Feb. 10, 1976. Several U.S. patents also disclose educational games or devices, including U.S. Pat. Nos. 3,617,260, which issued to E. H. Shuford, Jr., et al on Oct. 19, 1971; 3,696,528, which issued to H. A. Mertz on Oct. 10, 1972, and 3,918,173, which issued to J. Logos on Nov. 11, 1975. Most such teaching aids are either relatively simple in structure and limited in scope and/or appeal, or complicated in structure and thus expensive to produce in large quantities.

Of the above patents, only Canadian Pat. No. 696,380 discloses an apparatus of the type proposed by applicant. One embodiment of the patented apparatus includes a casing with an opening containing a mask. The mask includes a transparent portion and an opaque portion. Paper bearing questions and answers is fed to the mask, the question being visible through the transparent portion and the answers being hidden by the opaque portion. A student writes his answer to the question on the paper using an opening provided for such purpose, and then advances the paper to view the correct answer previously hidden by the mask. A second embodiment of the apparatus includes separate question sheets and an expendable strip of paper for answers. Such an apparatus is useful for older students who can write, but cannot be used by younger students who have not learned to write.

There exists a need for a teaching apparatus which is simple in structure and operation, and capable of capturing the attention of the students, particularly younger students.

SUMMARY OF THE INVENTION

The object of the present invention is to provide such a simple teaching apparatus, which is easy to operate and, being in the nature of a game, is likely to hold the interest of the person using the apparatus.

Accordingly, the present invention relates to a teaching apparatus including a casing; a first tape having a set of questions thereon in said casing; a second tape having answers to each of said questions in said casing; a first window in said casing for viewing one of said questions at a time; a second window in said casing for viewing a plurality of said answers at the same time, one of said answers being the correct answer to said question; means for moving said first tape past said first window to display another of said questions, the answer to which is visible in said second window; a plurality of tape actuation means equal in number to the answers visible through said second window at any one time extending out of said casing and visibly associated with each of said answers; and linkage means adapted to connect one of said tape actuation means to said tape moving means only when the tape actuation means associated with the correct answer is operated.

BRIEF DESCRIPTION OF THE DRAWINGS

The invention will now be described by way of example only, in greater detail, with reference to the accompanying drawings, which illustrate a preferred embodiment of the invention, and wherein.

DESCRIPTION OF THE PREFERRED EMBODIMENT(S)

Figure 1:
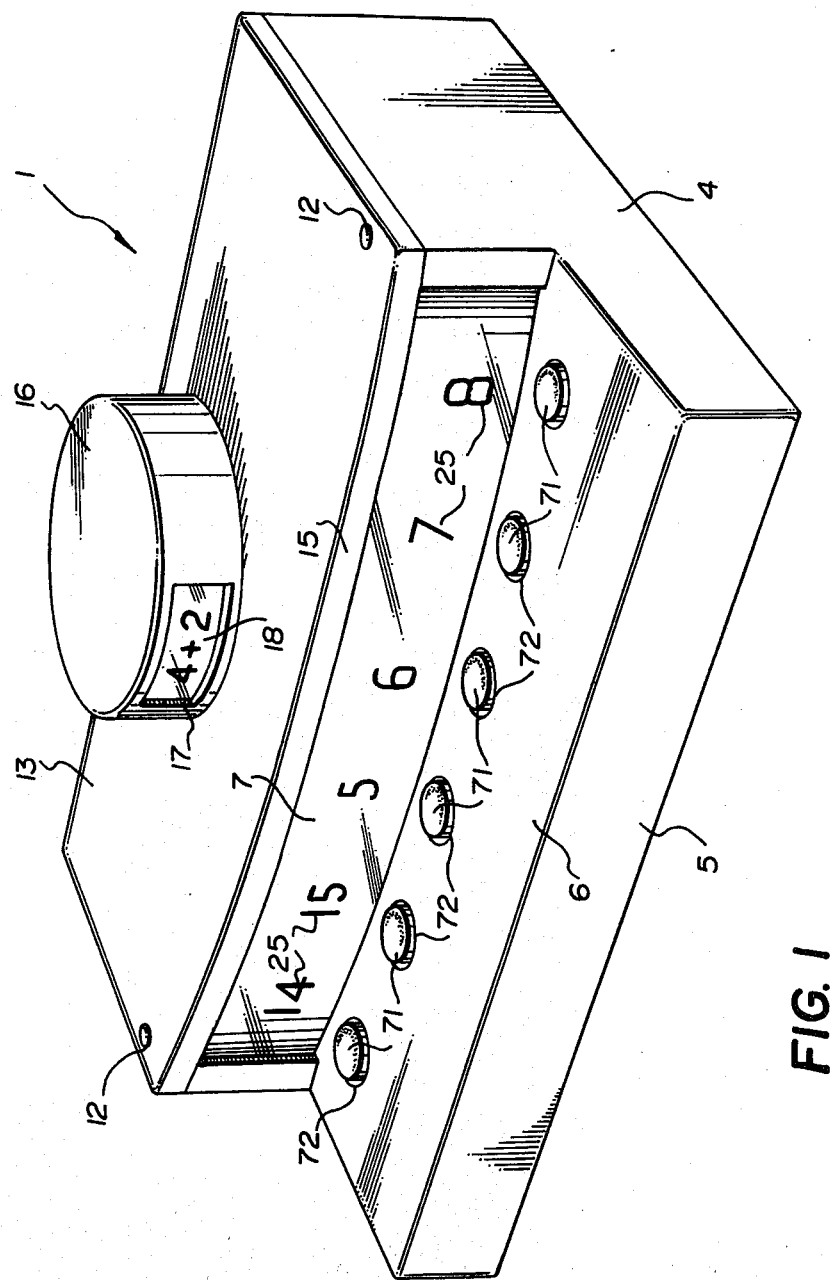
FIG. 1 is a perspective view from the front of a preferred embodiment of the apparatus of the present invention.
Figure 2:
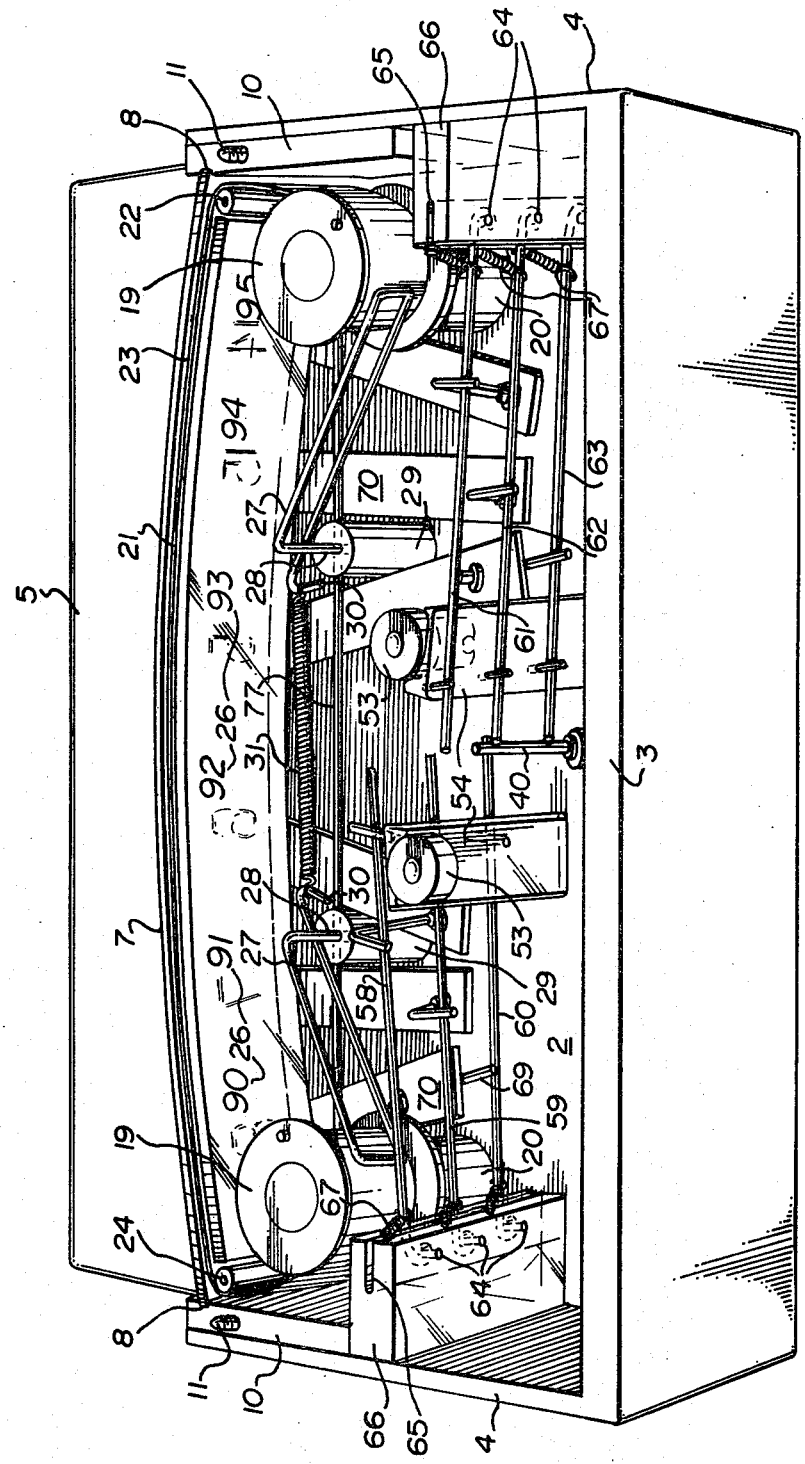
FIG. 2 is a perspective view from the rear of the apparatus of FIG. 1 with parts removed.

With reference to FIGS. 1 and 2, the apparatus of the present invention includes a casing generally indicated at 1 in the form of a rectangular parallelpiped with a planar base 2, planar rear and side walls 3 and 4, respectively, and a stepped front end formed by a step 5 with a flat top wall 6. The front of the casing 1 above the step 5 is open, the opening being closed by a transparent convex window 7, the ends of which fit into slots 8 in rectangular reinforcing plates 10 at the inner front ends of the casing 1. A pin 11 projects upwardly from near the front corner of each plate 10 for mating with a hole 12 in each front corner of a cover 13. The cover 13 is generally rectangular with a convex front edge 15 overlapping the window 7. The casing 1 is completed by a low cylindrical dome 16, with an open bottom end and an opening 17 in its front face closed by a window 18.

The casing 1 contains a pair of spools 19 mounted on posts 20 at each end of the casing near the front thereof. The spools 19 hold a tape 21 in the form of a strip of paper or the like. One end of the tape 21 is wound on one spool 19 and passes around a small roller 22 at the front corner of the casing 1, through a channel 23 defined by the window 7, which has a U-shaped cross-sectional configuration, and around another small roller 24 to the other spool 19. As illustrated in FIG. 1, the front of the tape 21, which is visible through the window 7, displays a plurality of numbers 25 (in this case 14, 15, 5, 6, 7 and 8), and the rear of the tape 21 displays a separate set of numbers 26 (FIG. 2) opposite the numbers 25 for the purpose described in greater detail hereinafter.

The tape 21 is maintained under tension on the spools 19 by a pair of arms 27 which press against the portions of the tape 21 wound around the spools. Each arm 27 is formed by a rod, one end 28 of which is pivotally mounted in a post 29 extending upwardly from the base 2 of the casing for rotation about a vertical axis. The rod extends upwardly from the post 29, outwardly and rearwardly to the spool 19 and then returns over the post 29 to a hook-shaped second end 30. The hook ends 30 of the arms 27 are interconnected by a helical spirng 31, which causes the outer ends of the arms 27 to press against the ends of the tape 21 on the spools 19. It will be noted that each arm 27 is, in effect, a first class lever. The arms 27 constitute simple tape tensioning devices. Of course, other tape tensioning devices could be used. For example, each of the rollers 22 and 24 could be replaced by a pair of pinch rollers in which case the arms 27 and spring 31 could be omitted.

Figure 3:
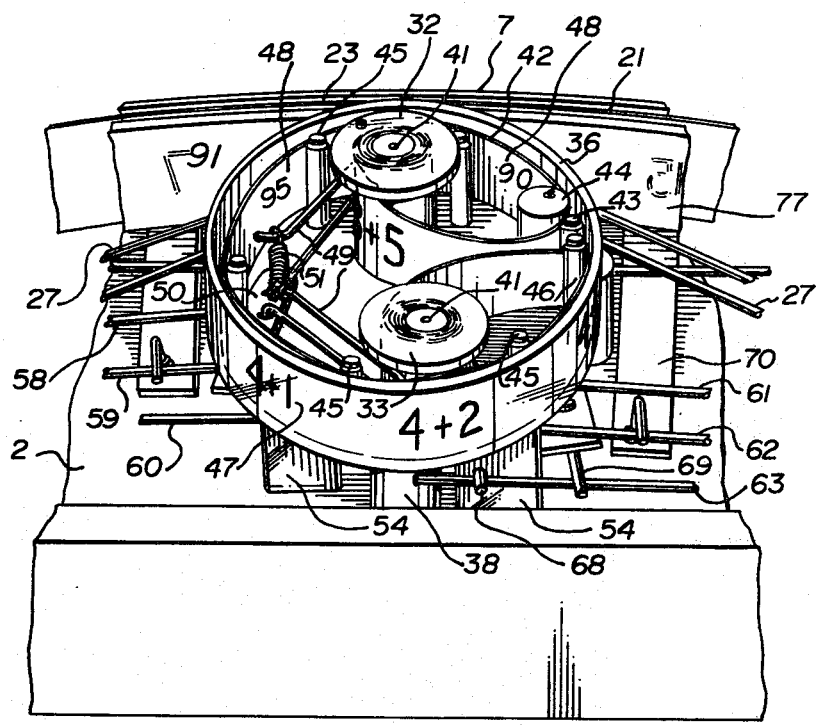
FIG. 3 is a perspective view similar to FIG. 2 of the central section of the apparatus of FIGS. 1 and 2.
Figure 4:
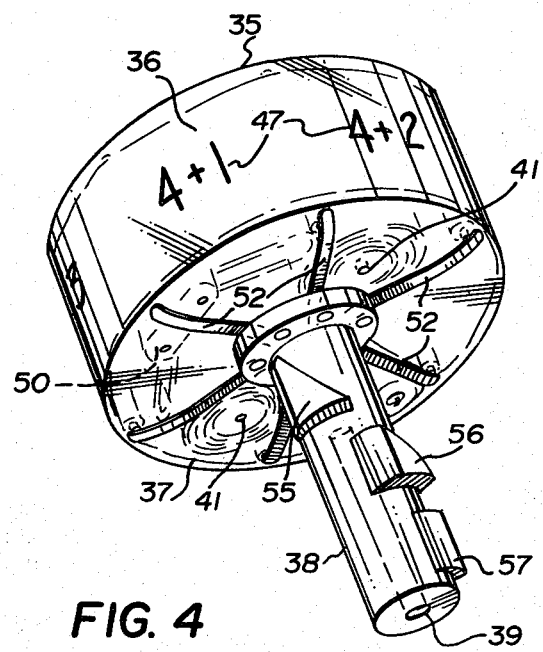
FIG. 4 is a perspective view from the bottom of a cup and cam device used in the apparatus of FIGS. 1 to 3.

A second pair of spools 32 and 33 (FIGS. 3 to 5) are rotatably mounted in a cup 35 in the casing 1. The cup 35 includes an annular transparent side wall 36 and a flat, circular base 37. The cup 35 is integral with a cam shaft 38, and, with the cover 13 in place, the cup 35 is surrounded by the dome 16, and the cam shaft 38 extends downwardly towards the base 2 of the casing 1. The shaft 38 is provided with a bore 39 in its bottom end for rotatably mounting the cup 35 and the shaft 38 on a pin 40 (FIG. 2) extending upwardly from the base 2 of the casing 1.

Each of the spools 32 and 33 is rotatably mounted on a shaft 41 extending downwardly into the base 37 of the cup 35. The shafts 41 are disposed on opposite sides of the cup 35 on a line extending through the centre thereof. One end of a second tape 42 similar to the tape 21, is wound around the spool 32. The tape 42 extends from the spool 32 towards the side wall 36 of the cup 35, between a roller 43 and a post 44, around rollers 45 in a path of travel parallel to the inner surface of the wall 36 of the cup 35, and then around a roller 46 to the other spool 33. Like the tape 21, the outer surface of the tape 42 displays numbers 47 (in this case two numbers with a plus sign therebetween), and the inner surface of the tape displays numbers 48 (i.e. the numbers 90 to 95) corresponding to the numbers 26 on the inner surface of the tape 21.

The tape 42 is tensioned on the spools 32 and 33 by a pair of U-shaped arms 49. One end of each arm 49 is pivotally mounted in a post 50, and the other, hook ends of the arms are interconnected by a helical spring 51. Thus, the outer ends of the arms 49 always apply pressure against the tape ends wound around the spools 32 and 33 to maintain the tape 42 under tension.

The base 37 of the cup 35 is provided with a plurality of radially extending metallic elements 52 (FIG. 4), selectively positioned about base 37, which are bowed downwardly near their outer ends to place them in close proximity to tops of magnets 53 (FIG. 2) fixedly mounted on the top ends of posts 54 which extend upwardly from the base 2 of the casing 1 on opposite sides of the shaft 38. The elements 52 and the magnets 53 function as a brake mechanism for retarding rotary motion of the cup 35 and the shaft 38 on the pin 40, and additionally ensure that when the cup 35 comes to a stop, the magnetic influence on one of the elements serves to align a new question with window 18.

In the preferred embodiment, the cam shaft 38 is provided with three generally triangular projections 55, 56 and 57 with gaps therebetween and between the topmost projection 55 and the base 37 of the cup 35. The trailing edges of the projections 55, 56 and 57 are inclined by the free inner ends of rods 58, 59 and 60 on one side of the shaft 38 and rods 61, 62 and 63 on the other side of the shaft 38. It should be noted that the projections 55, 56 and 57 are not vertically aligned, their trailing edges defining a portion of a helix, so that only one of the rods 58 to 63 can engage a projection 55, 56 or 57 during downward movement of the rod. The gaps between the projections 55, 56 and 57, and between the projection 55 and the base 37 of the cup 35 permit free rotation of the cup 35 and the shaft 38 when the rods 58 to 63 are in the rest positions, the rods extending into such gaps.

The rods 58 and 61 are suitably positioned to engage the inclined trailing end of the projection 55 depending on the orientation of the shaft 38. Likewise, the rods 59 and 62 are positioned to engage the projection 56, and the rods 60 and 63 are positioned to engage the projection 57. As mentioned above and as is apparent from FIG. 5, the projection 55, 56 or 57 engaged by one of the rods 58 to 63 during downward movement of the rod will be determined by the position of the shaft 38 and the cup 35.

The outer end of each of the rods 58 to 63 is pivotally mounted on a pin 64 extending between the sides of a U-shaped groove 65 in a block 66 extending inwardly from each side 4 of the casing 1. The rods 58 to 63 are biased upwardly by helical springs 67 connected to the rods and to the blocks 66, upward movement of the rods 58 to 63 being limited by pins 68 extending outwardly from the posts 54. Thus, in their rest positions, the inner free ends of the rods 58 to 63 are located above the top ends of the positions occupied by the projections 55, 56 and 57 as they rotate with the shaft 38. By depressing one of the rods 58 to 63, the shaft 38 and the cup 35 can be caused to rotate, provided the rod which is moved downwardly engages one of the projections 55, 56 or 57. Regardless of the position of the shaft 38, one of the rods 58 to 63 will be in a position to engage one of the projections 55, 56 or 57.

The rods 58 to 63 are moved downwardly by pins 69 on the inner free ends of levers 70. Each lever 70 extends forwardly toward the front end of the casing 1 into the step 5, and is provided with a button 71 (FIGS. 1 and 5) extending upwardly through an opening 72 in the top wall 6 of the step 5. The outer end 73 of each lever 70 is U-shaped, curving downwardly and then inwardly. The bottom arm 74 of the lever is secured to the casing 1 by a nut 75 on a bolt 76 extending upwardly through the base 2 of the casing 1. The levers 70, which are formed of hard plastic, are flexible. Each lever is held in position with the pin 69 resting lightly on a rod 58 to 63 by a rod 77 (FIGS. 2 and 5) extending between the sides of the casing 1.

It should also be apparent that by the repositioning and restructing of rods 58–63, only one projection 57 may be necessary since the magnetic influence on metallic elements 52 serve to ensure that the projection will be in engaging relationship with one of the rods 58–63. As a further possible alternative, the cam like surface could be replaced by a straight pin, and the end of rods 58–63 bent so as to provide the required rotational movement when brought into contact with the pin.

Figure 5:
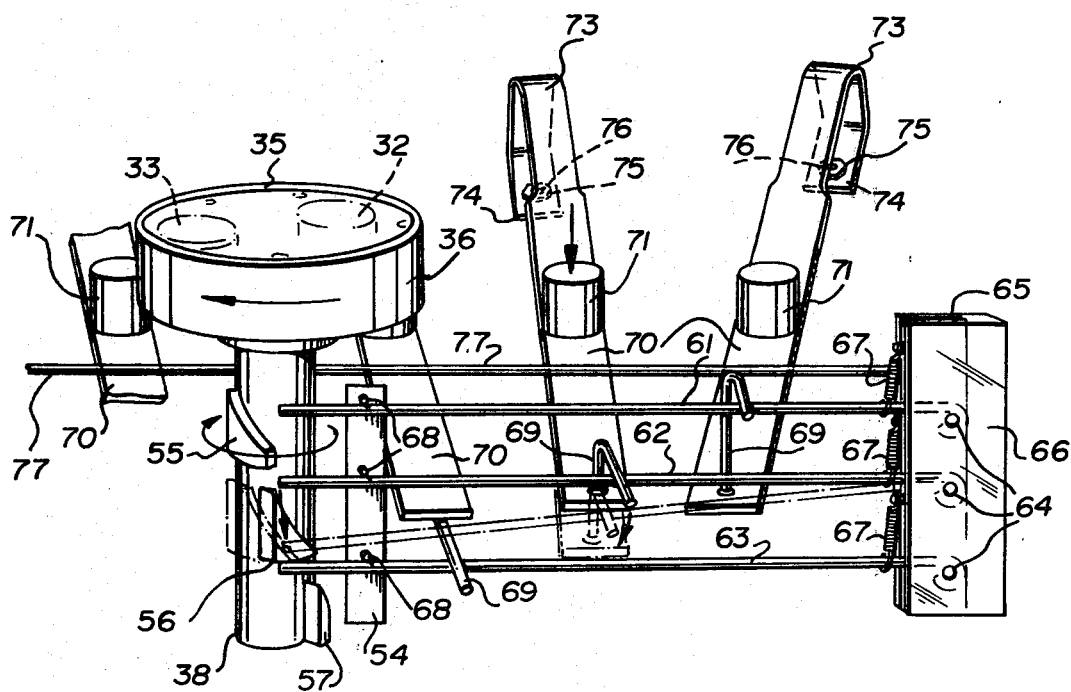
FIG. 5 is a perspective view from the rear of the cup and cam device of FIG. 5 in use.

In use, the cover 13 of the apparatus is removed, and the tapes 21 and 42 are wound on their respective spools until the numbers 26 and 48 (which provide indexing means) on the rear surfaces of the tapes are matched. With the numbers 26 and 48 matched, the outer surface of the tape 42 in the cup 35 displays a plurality of addition questions, only one of which is visible to the student through the window 18 at any one time. A plurality of answers are visible in the lower window 7 behind and aligned with the buttons 71. If the student depresses the correct button, i.e. the button in front of the correct answer to the question visible through the window 18, the lever 70 moves the appropriate one of the rods 58 to 63 to engage one of the cams 55, 56 or 57, causing the shaft 38 and the cup 35 to rotate. As shown in FIG. 5, by way of example, if the rod 62 is depressed to the position shown in phantom outline with the projection 56 in the correct position, the free end of the rod 62 moves down the inclined trailing edge of the projection 56 causing the shaft 38 and cup 35 to rotate. The same or another question appears in the window 18, and the process is repeated. If the wrong button is depressed, i.e. one of the five buttons in front of the incorrect answers, the cup 35 remains stationary and the same question is visible through the window 18. With the projections 55, 56 and 57 in the position shown in solid lines in FIG. 5, if the rod 58, 59, 60, 61, or 63 is pressed downwardly, the free end of the rod will not engage any of the projections 55, 56 and 57, and thus cannot cause the shaft 38 and cup 35 to rotate. By knowing which of the rods 58 to 63 will engage the projection 55, 56 or 57, it is a simple matter to match the questions on the tape 42 to the answers on the tape 21.

When the student has completed the visible set of questions, the spools may be rotated to provide either a completely new set of questions, or rotated partially to provide additional material as desired, and as would be dependant on the learning capability of the student.

It is readily apparent that the tapes are interchangeable and that virtually any questions and answers can be provided on the tapes, depending on the knowledge of the student. The questions and answers may be from any field of intellectual activity, and are not limited to mathematics.

It will also be appreciated that means for automatically changing the positons of the tapes 21 and 42 can be provided. For example, a gear or toothed wheel can be rotatably mounted on the inner surface of the top of the dome 16 for engaging gears or toothed wheels on the top ends of the spools 32 and 33. Rotation of a knob connected to the central gear and mounted on the outer surface of the top of the dome would result in a corresponding rotation of the spools 32 and 33. An indicator projection on the knob opposed by an annular row of letters or numbers would provide an indication of the series of questions visible through the window 18 during one complete revolution of the cup 35. A similar indicator could be provided on the top of the casing connected to one of the spools 19, with a corresponding row of letters or numbers matching those on the dome 16. Thus, the tapes 21 and 42 could readily be re-positioned to provide a new set of questions and answers.

Further modifications and alternative embodiments of the invention will be apparent to those skilled in the art in view of the foregoing description. Accordingly, this description is to be construed as illustrative only and is for the purpose of teaching those skilled in the art, the manner of carrying out the invention. It is understood that the form of the invention herewith shown and described is to be taken as the presently preferred embodiment. Various changes may be made in the shape, size and general arrangement of components. For example, equivalent elements may be substituted for those illustrated and described herein, parts may be reversed, and certain features of the invention may be used independently of the use of other features, all as will be apparent to one skilled in the art after having the benefits of the description of the invention.

What is claimed is:

1. A teaching apparatus including a casing; a first tape having a set of questions thereon in said casing; a second tape having answers to each of said questions in said casing; a first window in said casing for viewing one of said questions at a time; a second window in said casing for viewing a plurality of said answers at the same time, one of said answers being the correct answer to said question; means for moving said first tape past said first window to randomly display another of said questions, the answer to which is visible in said second window; a plurality of tape actuation means equal in number to the answers visible through said second window at any one time extending out of said casing and visibly associated with each of said answers; and linkage means adapted to connect one of said tape actuation means to said tape moving means only when the tape actuation means associated with the correct answer is operated.

2. An apparatus according to claim 1, including means for re-positioning said first and second tapes in said casing, whereby a different set of questions is available for viewing through said first window and answers to said questions are visible through said second window.

3. An apparatus according to claim 2, including a cylindrical cup in said casing carrying said first tape; shaft means rotatably supporting said cup in said casing; and means on said shaft for engagement by said linkage means to effect rotation thereof only in response to operation of the tape actuation means associated with the correct answer.

4. An apparatus according to claim 3 including a first pair of spools in said cup supporting said first tape in said cup; a second pair of spools supporting said second tape in said casing; and tensioning means for maintaining said first and second tapes in one position.

5. An apparatus according to claim 4, including indexing means associated with each of said first and second tapes for ensuring that the answers visible through said second window are correct for the set of questions on the first tape available to the first window.

6. An apparatus according to claim 3, wherein said linkage means includes a plurality of lever means equal in number to the answers visible through said second window at any one time, each of said lever means carrying one said tape actuation means at one location and cam engaging means at a second location.

7. An apparatus according to claim 3 including magnetic means positioned within said casing so as to cooperate with a plurality of metallic means selectively located on said cylindrical cup, whereby each of said metallic means defines the position of one of said answers on said second tape, which answer is automatically aligned with said second window when the magnetic force exerted by said magnetic means overcomes the rotational forces imparted to said shaft by operation of said tape actuation means, thereby bringing said cylindrical cup to a stop.

* * * * *